(12) United States Patent
Cocchini et al.

(10) Patent No.: US 10,934,205 B2
(45) Date of Patent: Mar. 2, 2021

(54) METHOD FOR MANUFACTURING A GLASS CORE PREFORM FOR OPTICAL FIBRES

(71) Applicant: Prysmian S.p.A., Milan (IT)

(72) Inventors: Franco Cocchini, Milan (IT); Antonio Adigrat, Milan (IT)

(73) Assignee: PRYSMIAN S.P.A., Milan (IT)

( * ) Notice: Subject to any disclaimer, the term of this patent is extended or adjusted under 35 U.S.C. 154(b) by 31 days.

(21) Appl. No.: 15/765,830

(22) PCT Filed: Oct. 9, 2015

(86) PCT No.: PCT/EP2015/073445
§ 371 (c)(1),
(2) Date: Apr. 4, 2018

(87) PCT Pub. No.: WO2017/059928
PCT Pub. Date: Apr. 13, 2017

(65) Prior Publication Data
US 2018/0282199 A1    Oct. 4, 2018

(51) Int. Cl.
*C03B 37/014* (2006.01)
*C03C 13/04* (2006.01)

(52) U.S. Cl.
CPC .. *C03B 37/01453* (2013.01); *C03B 37/01473* (2013.01); *C03C 13/045* (2013.01);
(Continued)

(58) Field of Classification Search
CPC ........ C03B 37/01453; C03B 37/01473; C03B 2201/12; C03B 2201/20; C03B 2203/22; C03C 13/045
See application file for complete search history.

(56) References Cited

U.S. PATENT DOCUMENTS

| 4,586,943 A | 5/1986 | Kyoto et al. |
| 4,629,485 A | 12/1986 | Berkey |
| | (Continued) | |

FOREIGN PATENT DOCUMENTS

| WO | 2000/058232 A1 | 10/2000 |
| WO | 2002/049977 A2 | 6/2002 |
| | (Continued) | |

OTHER PUBLICATIONS

International Search Report for International Patent Application No. PCT/EP2015/073445 dated Jun. 23, 2016, pp. 1-4.

*Primary Examiner* — Queenie S Dehghan
(74) *Attorney, Agent, or Firm* — Shumaker, Loop & Kendrick, LLP (57) ABSTRACT

A method of manufacturing a glass core preform for optical fibres including providing a porous soot core preform having a central longitudinal hole extending axially therethrough and an a/b ratio of from 0.20 to 0.40; simultaneously dehydrating and doping with fluorine the soot core preform at a temperature of from 1000° C. to 1350° C. by exposing it to an atmosphere containing a chlorine-containing gas and a fluorine-containing gas, the content of the fluorine-containing gas in the atmosphere being of from 0.01% to 0.50% by volume, and simultaneously consolidating the soot core preform and closing the central longitudinal hole by exposing the soot core preform to an atmosphere substantially devoid of fluorine and of chlorine at a consolidation temperature of from 1500° C. to 1650° C., while reducing the pressure down the central hole, thereby forming a glass core preform.

11 Claims, 4 Drawing Sheets

(52) U.S. Cl.
CPC ...... *C03B 2201/12* (2013.01); *C03B 2201/20* (2013.01); *C03B 2203/22* (2013.01)

(56) References Cited

U.S. PATENT DOCUMENTS

| | | |
|---|---|---|
| 4,772,302 A | 9/1988 | Abe |
| 4,812,155 A | 3/1989 | Kyoto |
| 5,163,987 A | 11/1992 | Ishiguro et al. |
| 2003/0221459 A1 | 12/2003 | Walczak |
| 2007/0125129 A1* | 6/2007 | Dayanandan ..... C03B 37/01473 65/414 |
| 2012/0321891 A1* | 12/2012 | Nunome ........... C03B 37/01453 428/392 |
| 2013/0016408 A1 | 5/2013 | Bookbinder et al. |
| 2013/0136406 A1 | 5/2013 | Bookbinder et al. |
| 2014/0352361 A1* | 12/2014 | Dawes .............. C03B 37/01453 65/397 |
| 2015/0143852 A1 | 5/2015 | Bookbinder |
| 2016/0214884 A1* | 7/2016 | Inoue ................ C03B 37/01228 |

FOREIGN PATENT DOCUMENTS

| | | |
|---|---|---|
| WO | 2013/003003 A1 | 1/2013 |
| WO | 2014/101949 A1 | 7/2014 |
| WO | 2014/193801 A1 | 12/2014 |

* cited by examiner

METHOD FOR MANUFACTURING A GLASS CORE PREFORM FOR OPTICAL FIBRES

FIELD OF THE INVENTION

The present invention relates to a method of manufacturing a preform for optical fibres. In particular, the present disclosure concerns a method of manufacturing a core preform to produce an optical fibre comprising a fluorine-doped region.

BACKGROUND

The use of single-mode optical fibres in fibre-to-the-premises (FTTP) applications, including fibre-to-the-home (FTTH) and fibre-to-the-building (FTTB) applications, generally require low bending loss of optical signals transmitted through the fibres, also under stringent installation constraints that may impose tight bend radii, e.g., due to sharp cornering in buildings or compression of optical fibres. In addition, coarse wavelength division multiplexing systems (CWDM) and passive optical network (PON) systems may also need employment of bend-insensitive optical fibres.

Optical fibers having low bending loss may be obtained by doping a region surrounding the fibre core, in order to suitably shape the refractive index profile. Fluorine is a commonly used dopant for lowering the refractive index.

In US 2013/136406 a low bend loss optical fibre is disclosed having a trench (depressed refractive index region) that is offset to the core region. The trench index ($\Delta_3$) with respect to the overclad (the outermost cladding layer) is: $0.01\% \leq \Delta_4 - \Delta_3 \leq 0.09\%$, with the absolute volume of the trench $V_3$ of between about 5% and 40% $\mu m^2$.

Patent application US 2013/136408 describes a single mode optical fibre comprising: a graded index central core region having outer radius $r_1$, a relative refractive index $\Delta_1$, a maximum relative refractive index $\Delta_{1max}$ and having an alpha profile, $alpha_{core}$, of $0.5 \leq alpha_{core} \leq 4$; a cladding region including (a) a trench region surrounding said graded index central core region and comprising a relative refractive index delta $\Delta_3$ profile that becomes more negative with increasing radius, said trench region having an inner radius $r_2$, an outer radius $r_3 > 10$ microns, and a minimum relative refractive index $\Delta_{3min}$ such that $\Delta_{1max} > \Delta_{3min}$, $r_3 \geq r_{3a}$, and $0.5 \leq (r_{3a} - r_2)/(r_3 - r_2) \leq 1$, where $r_{3a}$ is a distance from fibre centreline where $\Delta_3$ first reaches the value $\Delta_{3min}$, said trench region having an alpha profile, $alpha_t$ such that $0.5 \leq alpha_t \leq 5$, and (b) an outer cladding region surrounding said trench region and having a relative refractive index $\Delta_4$, and $\Delta_{3min} < \Delta_4$.

A method for producing a glass preform for producing a quartz glass preform with fluorine incorporated therein is described in U.S. Pat. No. 4,812,155. This patent states that, according to the disclosed method, the rate of incorporation of fluorine into fine glass particles is increased and the incorporation of impurities such as Fe and Cu into glass during the process of adding fluorine is prevented. In the method, a soot particulate mass is first heated in a gas atmosphere containing at least a gas of a non-hydrogen containing fluorine-based compound and a gas of chlorine-based compound containing no fluorine to dope the particulate mass with fluorine in a muffle tube made of pure quartz and having iron and copper impurities and then the fluorine-doped glass particulate mass is heated to produce a transparent glass preform for optical fibers in a muffle tube made of pure quartz.

Patent U.S. Pat. No. 4,772,302 concerns the manufacture of optical waveguide having a fluorine doped silica cladding and a pure or doped silica core.

A method of forming a glass article at least a portion of which is doped with fluorine is disclosed in U.S. Pat. No. 4,629,485. The method comprises the steps of forming a glass preform at least a portion of which is porous and contains interstices, inserting said preform into a consolidation furnace having a muffle formed of a high silica content glass, flowing over the surface of said porous portion a gas comprising fluorine, a portion of said gas diffusing inwardly through the interstices of said preform, and heating said porous preform to a temperature within the consolidation temperature range for a time sufficient to cause said fluorine to diffuse into the surfaces of said interstices and to cause the porous portion of said preform to fuse and form a fluorine-doped dense glass. Preferably, the step of flowing comprises flowing a gas including a sufficient amount of chlorine to dry said preform.

U.S. Pat. No. 4,586,943 provides a method for producing a glass preform for optical fibers by heating a glass soot preform consisting of glass fine particles made mainly of silicon oxide, which method comprises the steps of: (1) heating the glass soot preform to dehydrate and to remove impurities therefrom; (2) heating the glass soot preform in a gas atmosphere containing at least fluorine or fluorine-based compound to add fluorine to the glass soot preform; and (3) heating the glass soot preform to make it transparent.

Patent U.S. Pat. No. 5,163,987 describes a method for producing a glass preform for use in the fabrication of an optical fibre, which comprises adding fluorine to a soot preform in an atmosphere comprising a fluorine-containing compound at a temperature at which the soot preform is in the porous state and then keeping or inserting it in an atmosphere containing a fluorine-containing compound for dehydrating water and/or removing impurities. Dehydration with the chlorine-containing compound is carried out prior to or simultaneously with the addition of fluorine, whereas the vitrification of the preform is carried out in the absence of the chlorine-containing compound in view of an improvement of hydrogen resistance or radiation resistance. The patent states that, since the vitrification of the soot preform is carried out in the presence of the fluorine-containing compound, the fluorine added to the peripheral portion of the preform in the fluorine adding step is not dissipated in the vitrifying step.

Patent application WO 00/58232 A1 describes a method for incorporating fluorine internally into a soot preform by exposing the soot preform to a fluorine containing gas for a time and at a temperature which is sufficient to result in a lowering of the fluorine content along the surface of the soot preform which is in contact with the fluorine containing gas, preferably $CF_4$. The fluorine doping step is carried out in a furnace muffle, through which the fluorine-containing gas flows and preferably contains a diluent gas such as helium. An optional centre flow helium gas may be employed. The fluorine doping operation is carried out for a time which is sufficient to result in the fluorine content of the resulting glass becoming depleted at the outer surface of the soot body, which is in contact with the fluorine gas, while the fluorine content increases toward the centre of the blank as the doping time increases.

Patent application WO 02/49977 A2 relates to the manufacturing of a preform having a fluorine doped region. A described method includes heat treating a porous soot preform substantially devoid of any sintered glass layer, preferably in an atmosphere substantially devoid of any halide containing compound, to a first temperature and exposing the preform to an atmosphere comprising a fluorine containing compound at a second temperature, wherein the rate of reaction between the fluorine and the soot and the rate of diffusion of the fluorine compound into the preform are both temperature dependent and the increase in the rate of reaction as a function of increasing temperature is greater than the increase in rate of diffusion as a function of increasing temperature, thereby controlling the radial penetration of fluorine into the preform. Heat treating the porous soot preform is to a temperature greater than 1200° C.

In WO 2014/193801 A1, a method of making an optical fibre preform is disclosed, which comprises in order the steps of: (i) manufacturing a glass preform with at least one porous layer; (ii) pre-densifying said preform to increase the average density of said porous glass layer to at least 0.7 g/cm$^3$ but less than 1.9 g/cm$^3$ thereby forming a pre-densified preform; (iii) exposing the pre-densified preform to a fluorine precursor at a temperature at 1290° C. or less to make a pre-densified fluorine doped preform with the maximum concentration of fluorine at or adjacent to an outmost region of said pre-densified fluorine doped preform, (iv) exposing the pre-densified fluorine doped preform to temperatures above 1400° C. to completely sinter the fluorine doped preform; and thereby forming a fluorine doped profile in said fluorine doped sintered preform such that the ratio of the concentration of fluorine in an inner region of the preform to concentration of fluorine in the region of the preform with maximum fluorine concentration is less than 0.4. In the disclosed embodiments, the relative refractive index becomes more negative with increasing radius of the preform.

The formation of the low-index trench around the core of the optical fibre generally adds additional steps to the process of making an optical fibre preform, thereby increasing the costs of the process of making an optical fibre. Patent application WO 2013/003003 A1 concerns methods for forming optical fibre preforms with low-index trenches. According to one embodiment, the method includes depositing silica-based glass soot on a bait rod to form a low-index trench region of the optical fibre preform. The silica-based glass soot is deposited such that the low-index trench region has a first density. A barrier layer having a second density greater than the first density is formed around the low-index trench region. Silica-based glass soot is then deposited around the barrier layer to form an overclad region of the optical fibre preform thereby forming a trench-overclad assembly. The bait rod is then removed from a central channel of the trench-overclad assembly and a separately formed core assembly inserted into the central channel. A precursor gas comprising a down-dopant is then directed through the central channel of the trench-overclad assembly as the trench-overclad assembly is heated to dope the low-index trench region with the down-dopant, wherein the barrier layer prevents diffusion of the down-dopant from the low-index trench region into the overclad region.

Applicant observed that in the method of WO 2013/003003 a possible decrease in manufacturing costs may come at the expenses of a less efficient removal of metal contaminations and/or hydroxyl groups since, during the dehydration phase, chlorine molecules are hindered from diffusing in the core region because of the presence of the barrier layer with higher density.

SUMMARY

The present disclosure generally relates to a manufacturing process of a glass core preform in which fluorine doping is carried out by fluorinating a porous soot core preform comprising a central hole extending axially there through. In some preferred embodiments, the soot core preform is obtained by outside vapour deposition (OVD).

The present disclosure is aimed at manufacturing a glass preform for use in the fabrication of a bend-resistant single-mode optical fibre having a trench-assisted refractive index profile. Applicant observed that a light fluorine doping in a region surrounding the core region of the glass core preform would be advantageous in terms of obtaining a fibre which is fully compatible with standard G.652 fibre. If a shallow trench is to be obtained by fluorine doping, preferably of relative refractive index difference from −0.0015 to −0.0035, it is preferred that the trench is sufficiently wide to ensure an efficient decrease in bend losses. However, Applicant noted that if fluorine is too close to the core region, typically doped with germanium, structural defects may be created, which increase hydrogen sensitivity and thus may affect the optical attenuation of the final fibre.

Fluorine doping is carried out by exposing a porous soot core preform to an atmosphere containing a fluorine-containing gas, which can penetrate across the porous structure of the soot. Applicant understood that it would be advantageous to control the penetration depth of fluorine across the preform in such a way to have a region substantially devoid of fluorine, positioned between the core region and the fluorine-doped region.

Manufacturing processes starting from a soot core preform generally include subjecting the soot preform to dehydration by flowing a drying gas to remove metal impurities and hydroxyl radicals (—OH), which would negatively affect the optical attenuation of the optical fibre. Subsequent to dehydration, the soot core preform needs to be consolidated by subjecting the preform to a temperature higher than the glass transition temperature and sufficient to induce sintering of the porous preform into solid glass. In order to produce a core rod for a preform for an optical fibre, complete closure or collapse of the central longitudinal hole is required. Closure of the central hole can be attained during or after consolidation of the core preform, the latter for example by redrawing or stretching the consolidated core preform.

Applicant considered that a combined dehydration and fluorine doping process would be advantageous in terms of efficiency of the overall manufacturing process of an optical fibre.

Applicant observed that the presence of fluorine during consolidation of the soot core preform is generally not an efficient way of doping the preform because diffusion of fluorine through the preform is at least partly hindered by the vitrification process. On the other hand, continuing the exposure to a chlorine-containing gas after dehydration, e.g. during vitrification, may cause the creation of structural defects, which are seemingly caused by a relatively high concentration of chlorine in the core region, usually doped with germanium, and which may affect optical attenuation.

Consistently with the present disclosure, the soot core preform is doped with fluorine during dehydration. Dehydrating and doping with fluorine the soot preform comprises exposing the soot core preform to an atmosphere including a chlorine-containing gas and a fluorine-containing gas. Temperature during dehydration and F-doping of the soot core preform is of from 1000° C. to 1350° C. The content of the fluorine-containing gas in the atmosphere is of from 0.01% to 0.50% by volume. Preferably, the content of fluorine-containing gas in the atmosphere is of from 0.05% to 0.20% by volume.

Applicant realised that, with a simultaneous vitrification of the soot core preform and closure of the central hole following a combined dehydration with a chlorine-containing gas and fluorine doping of the soot preform, it is possible to control the penetration depth of fluorine while attaining a substantially uniformly doped depressed-index region along the length of the preform. In particular, fluorine diffusion from the external side of the preform can be limited to approximately one fourth of the radius of the soot core preform, in a stable and repeatable way. In this way, core preforms capable of producing fibres with improved bending performances were obtained. Preferably, the core preform comprises a fluorine-doped region extending from the outer surface of the core preform.

Consistently with the present disclosure, a method for manufacturing a core preform for optical fibres comprises:
  providing a porous soot core preform comprising a central longitudinal hole extending axially therethrough and a core-to-clad (a/b) ratio of from 0.20 to 0.40;
  simultaneously dehydrating and doping with fluorine the soot core preform at a temperature of from 1000° C. to 1350° C. by exposing the soot core preform to an atmosphere containing a chlorine-containing gas and a fluorine-containing gas, the content of the fluorine-containing gas in the atmosphere being of from 0.01% to 0.50% by volume, and
  simultaneously consolidating the soot core preform and closing its central longitudinal hole by exposing the soot core preform to an atmosphere substantially devoid of fluorine and of chlorine at a consolidation temperature of from 1500° C. to 1650° C. while reducing the pressure down the central longitudinal hole, thereby forming a glass core preform.

Preferably, the a/b ratio is of from 0.25 to 0.35.

Without wishing to be bound by any theory or explanation, the presence of chlorine may render the etching of fluorine less effective since chlorine is expected to react mainly with the —OH groups, which otherwise would tend to react with fluorine, by producing HF.

Hydrofluoric acid generally has a strong etching effect on the porous layer, with the consequent reduction of the fluorine doping level because of etching. Once the dehydration and F-doping phase ends and flows of chlorine- and fluorine-containing gases is stopped, reduction of pressure down the central hole of the preform can prevent unwanted diffusion of the fluorine from the F-doped region. A consolidation phase with simultaneous closure of the central hole has also the advantage of reducing the overall processing time for the formation of a glass core preform.

The fluorine-containing gas is preferably selected from the group consisting of $SiF_4$, $SF_6$, $CF_4$, and $C_2F_6$. Other fluorine-containing gases which could be used in the process of the present disclosure are $C_4F_8$, $CC_2F_2$, $Si_2F_6$, $NF_3$, and $F_2$. Chlorine gas is preferably used as drying gas, although other chlorine-containing gases, such as $SiCl_4$ or $CCl_4$, can be employed.

According to the present disclosure, the method comprises a consolidation of the soot core preform simultaneous to the closure of the preform's central longitudinal hole by reducing the pressure down the central hole during consolidation. Reduction of pressure down the hole during consolidation is preferably to a pressure of less than 100 mbar. Preferably, reduction of pressure is attained by applying vacuum in the central longitudinal hole. In an embodiment, reduction of pressure is to a pressure of from 5 to 50 mbar.

The soot core preform has an outer surface and, preferably, during simultaneous dehydration and fluorine-doping, gases contained in the atmosphere diffuse through the soot from the outer surface.

Preferably, the core preform rotates about its longitudinal axis during the simultaneous consolidation and closure of the central longitudinal hole, more preferably with uniform rotation.

Preferably, the soot core preform rotates about its longitudinal axis during the dehydration and fluorine doping phase, more preferably with uniform rotation.

In some embodiments, the method further comprises, before exposing the soot core preform to an atmosphere including a chlorine-containing gas and a fluorine-containing gas, exposing the soot core preform to an atmosphere including a chlorine-containing gas and substantially devoid of fluorine. Preferably, in these embodiments, a drying phase carried out for a drying processing time and a combined drying and F-doping phase for a doping processing time, the sum of the drying and doping processing times corresponding to a total processing time for the dehydration and F-doping of the preform.

In some embodiments, dehydration takes place only simultaneously with fluorine doping. In these embodiments, a chlorine-containing gas is present always in combination with a fluorine-containing gas.

In an embodiment, the total processing time to carry out the dehydration and F-doping is of from 120 to 240 minutes (min).

A method for manufacturing an optical fibre is provided, the method comprising:
  manufacturing a glass core preform in accordance with the present disclosure;
  stretching the glass core preform to reduce its outer diameter thereby forming at least one glass core rod;
  overcladding the glass core rod to form an optical fibre preform formed by the glass core rod surrounded by a glass overclad layer, and
  drawing the optical fibre preform to produce an optical fibre.

By the method, an optical fibre comprising a fluorine-doped region located between a core region and an outer cladding region can be produced.

According to some preferred embodiments, a method consistent with the present disclosure produces a single-mode optical fibre having bend performance compliant to the ITU-T G.657.A1 standard, version (10/2012), preferably with macrobending loss exceeding the requirements of ITU-T G.657.A1 (10/2012) standard and being between the requirements set by ITU-T G.657.A1 (10/2012) and those set by ITU-T G.657.A2 (10/2012).

BRIEF DESCRIPTION OF THE DRAWINGS

The present invention will be now described more fully hereinafter with reference to the accompanying drawings, in which some, but not all embodiments of the invention are shown. Drawings illustrating the embodiments are not-to-scale schematic representations.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein.

DETAILED DESCRIPTION

In the preferred embodiments, the glass core preform to be obtained by the method consistent with the present disclosure is used for the manufacturing of a single-mode optical fibre suitable for optical transmission systems, in particular for a bend-resistant single-mode optical fibre.

The glass core preform has a trench-assisted refractive index profile, comprising a depressed-index region positioned outwardly a core region. In some preferred embodiments, the depressed-index region extends from the outer surface across the preform for a width of from 0.2 to 0.4 with respect to the outer radius of the preform.

Preferably, the glass core preform is made of a silica-based material.

The glass core preform is obtained from a soot preform formed using a flame hydrolysis deposition process, preferably an outside vapor deposition (OVD) process. In the OVD process, a longitudinal mandrel, generally tapered to ease removal and made of alumina or other ceramic material, is secured to a hollow handle at one of its ends, which will be referred to as preform handle. The preform handle is typically of a generally tubular shape with one or more protuberances to ease suspension and/or engagement of the preform in the apparatus for further processing of the core preform. The preform handle and the opposite end of the mandrel are mounted on a lathe configured to rotate the mandrel and translate it with respect to one or more flame hydrolysis burners that supply a stream of silica-based particulate material (i.e. soot) for the formation of a porous soot preform. Flow-rates of reactants introduced in the burners, e.g. $GeCl_4$ and $SiCl_4$, may be varied during deposition of the soot layers, in a way per se known, to obtain a predetermined refractive index profile in the soot preform.

Optical properties of the optical fibre are determined mainly by the refractive index profile of the core region and a region directly surrounding the core region, referred in the following to as near-clad region. Preferably, the soot core preform has a core region and a near-clad region surrounding the core region. Preferably, the near-clad region is made of non intentionally doped silica, which is referred in the present description and claims to as pure silica. In some embodiments, the soot core preform comprises a core region with positive relative refractive index with respect to the refractive index of pure silica. In an embodiment, the core region has a step-index profile. Preferably, the core region is made of silica doped with a doping element that increases the refractive index, such as germanium. In some embodiments, the refractive index profile of the core region may exhibit a central dip surrounded by a region of relative positive refractive index.

As it is generally known, during OVD deposition, soot fills outwardly a longitudinal portion of the preform handle making it integral with the soot core preform and for that reason it is often indicated as core integral handle. After completion of the deposition process, the mandrel is removed from the soot preform leaving a central hole along the longitudinal axis of the soot preform. In accordance with the present disclosure, the soot core preform is subject to a dehydration and fluorine doping process followed by a consolidation process in order to form a glass core preform.

Figure 1:
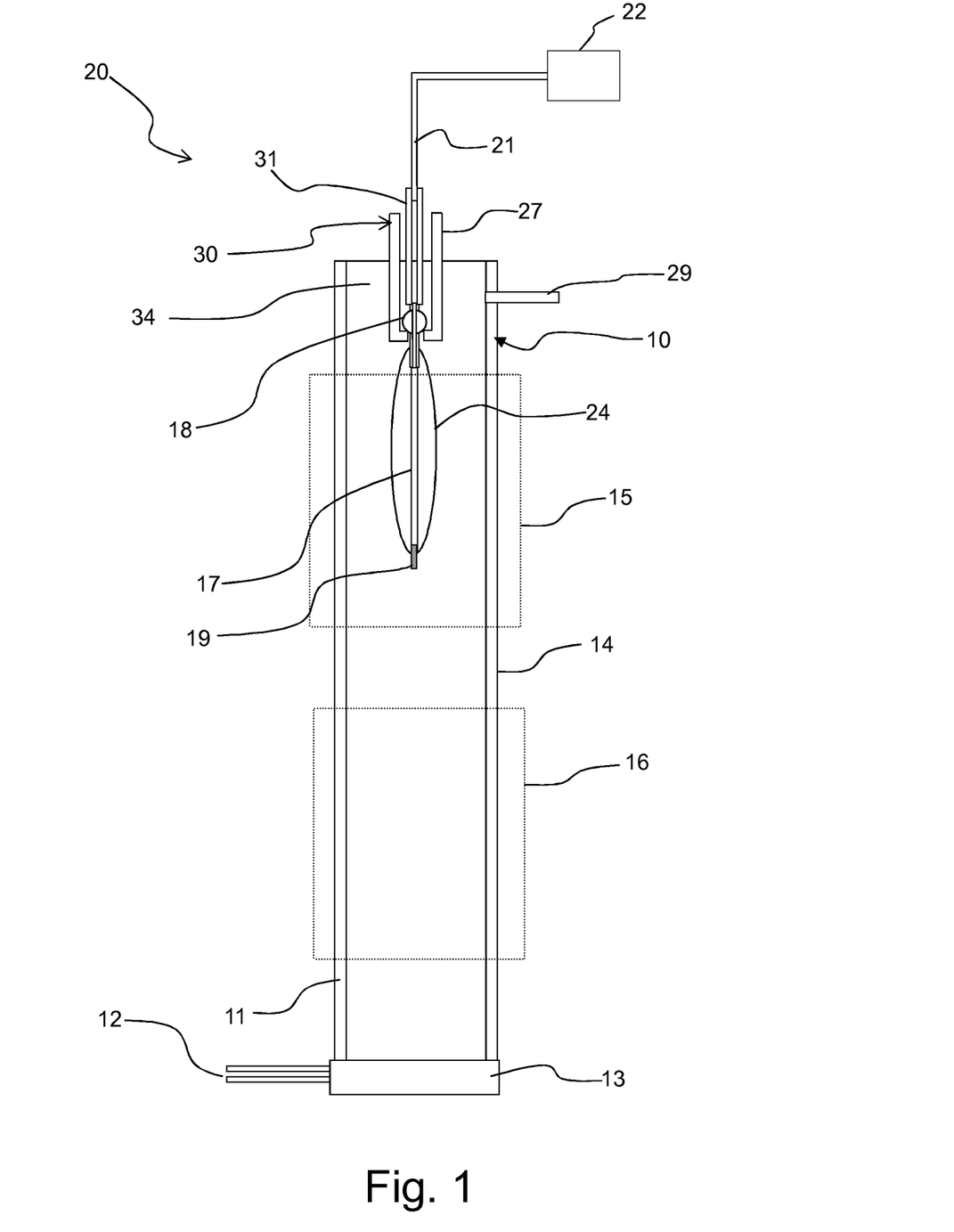
FIG. 1 is a lateral view of an apparatus for dehydration and fluorine doping and consolidation of a soot preform with some parts shown in cross-sectional view to better highlight some details of the apparatus, in accordance with an embodiment consistent with the present disclosure.

FIG. 1 is a lateral view of an apparatus for dehydration and fluorine doping and consolidation of a soot preform with some parts shown in cross-sectional view to better highlight some details of the apparatus, in accordance with an embodiment consistent with the present disclosure. A porous soot core preform 24, preferably obtained by OVD, is processed in a dehydration and consolidation apparatus 20. The porous preform 24 has a longitudinal axis and a central hole 17 along the longitudinal axis, indicated as central longitudinal hole, which extends axially through the preform. The porous soot preform has an outer surface and an inner surface, wherein the inner surface longitudinally delimits the central hole 17.

The porous preform is provided at one of its ends with a hollow preform handle 18 attached to one end of the preform or being an integral part of the preform. Preform handle 18 has a longitudinal aperture in correspondence to the central longitudinal hole 17. This configuration allows feeding of gases and/or application of vacuum through the handle down to the central hole.

The apparatus 20 comprises a furnace body 10 having a basement 13. The furnace body 10, which is configured to house an elongated preform, extends along a furnace longitudinal direction and it is vertically oriented so that the furnace longitudinal axis is parallel to a downfeed direction for the translational movement of the preform along the furnace body. The furnace body is preferably a vertical muffle, more preferably of cylindrical shape, having a lateral wall 11 with an inner surface. The furnace is connected to a gas delivery system (not shown) through one or more gas inlet ducts 12 for the supply of carrier gases, which are discharged from an outlet 29. In the embodiment of the figure, gases are fed from the bottom of the furnace. When gases are fed through ducts 12, the outer surface of the preform is exposed to an atmosphere containing those gases, which can diffuse across the porous structure of the soot.

The porous preform 24 is suspended by means of a conventional vertical translational device or downfeed system 30, of which only part is diagrammatically shown in the figure. The downfeed system 30 comprises a support handle 27, for example a hook-on support handle engaging the preform handle 18. In ways per se known, the downfeed system imparts to the support handle 27 a translational movement (up and down) along the furnace body and a rotation about a longitudinal axis parallel to the downfeed direction. Consequently, the preform can move down (and up) in the furnace body and can rotate about its longitudinal axis.

The top part of the preform handle 18 is connected to a hollow inner handle 31, inserted in the support handle 27. A flow passage is provided through the hollow inner handle 31 down into the central hole 17 of the preform through the preform handle.

To reduce the pressure in the central longitudinal hole by applying vacuum, a vacuum duct 21 is inserted into the axial aperture of the hollow inner handle 31 and it is connected to a vacuum pump 22 (or other types of vacuum source). In an embodiment, the vacuum duct 21 is a flexible tube of suitable length so as to allow the movement of the preform up and down the furnace body. Since it is preferred that the preform rotates both during dehydration and F-doping step and during consolidation, the tube 21 needs to rotate to follow the rotation imparted to the support handle 27 by the downfeed system 30. In ways per se known, the vacuum duct 21 may be directly connected to the pump 22 or to a (stationary) pump delivery duct, through a rotary junction, the pump delivery duct being connected to the pump.

The support handle 27 enters the cavity 34 of the furnace body 10 from the top. Although not shown in the figure, the furnace body is provided with a top hat that acts as closure lid of the main furnace body and has a hole through which the supporting handle 27 passes. When the preform is completely inserted, as in the configuration shown in the figure, the top hat prevents gases and heat from leaking out from the top of the furnace body 10.

Preferably, a short rod or plug 19, preferably made of glass, for example made of standard quartz or of low-temperature melting glass, is fitted at the bottom of the central hole, opposite to the upper side of the hole connected to the inlet tube 21, for sealing the channel from below for a more efficient evacuation of the central hole when vacuum is applied.

For the process of dehydration and fluorine doping to start, the porous soot core preform is attached to the downfeed system 30 and it is positioned above and outside the furnace body. The porous preform is then moved down to a drying hot zone 15 of the furnace, extending along the furnace longitudinal direction for a first longitudinal section of the furnace body 10. The drying hot zone 15, indicated in the figure with a dotted line, is for dehydration of the porous layers of the soot core preform. Preferably, the drying hot zone 15 is an isothermal zone.

In a dehydration process one or more drying gases, typically including or consisting of chlorine, are fed in the furnace together with an inert gas, preferably helium. In the apparatus shown in FIG. 1, helium and chlorine gases flow upwardly through the furnace body 10 from inlet ducts 12. Consistently with the present disclosure, the soot core preform is doped with fluorine during dehydration, namely at least a part of the step of dehydrating the soot preform is performed concurrently with fluorine doping. The fluorine-containing gas is preferably selected from the group consisting of $SiF_4$, $SF_6$, $CF_4$, and $C_2F_6$. The temperature of the drying hot zone 15 during simultaneous dehydration and F-doping is of from 1000° C. to 1350° C. and is indicated in the following as dehydration temperature, Td.

Preferably, chlorine-containing and fluorine-containing gases are diluted in an inert gas, preferably helium.

Preferably, the step of simultaneously dehydrating and doping with fluorine the soot core preform is carried out by exposing the soot core preform to an atmosphere including a chlorine-containing gas and a fluorine-containing gas so that the fluorine-containing gas is present together with the chlorine-containing gas throughout the entire step.

Preferably, the concentration of the fluorine-containing gas in the atmosphere is of from 0.01 vol. % to 0.50 vol. %, more preferably from 0.05 vol. % to 0.20 vol. %.

Preferably, the concentration of the chlorine-containing gas in the atmosphere is of from 0.5 vol. % to 3.0 vol. %.

In some embodiments, helium is flown in the furnace in such an amount to substantially fill the furnace inner volume. Preferably, the chlorine-containing gas is $Cl_2$ gas.

In some embodiments, the fluorine-containing gas is $SF_6$.

With no intention to limit the present disclosure, the following description will refer to $Cl_2$ gas and $SF_6$.

In some embodiments, the method comprises, before simultaneously dehydrating and doping with fluorine the soot core preform dehydrating the soot core preform by exposing the soot core preform to an atmosphere including a chlorine-containing gas and substantially devoid of fluorine. With reference to "substantially devoid of fluorine" it is meant an atmosphere having no intentionally added fluorine. Preferably, dehydrating in an atmosphere substantially devoid of fluorine is at a temperature of from 1000° C. to 1350° C. In some embodiments, the step of dehydrating (with no fluorine doping) is carried out at the same temperature as that of the simultaneous dehydration and F-doping step.

The drying hot zone 15 is set at a dehydration temperature Td that induces no sintering of the soot. In some embodiments, dehydrating and doping with fluorine is at a temperature Td of from 1000° C. to 1350° C. Preferably, during dehydrating and doping with fluorine, no substantial sintering of the soot core preform should take place.

In the apparatus shown in FIG. 1, combined dehydration and fluorine doping can be carried out by flowing upwardly through the furnace body 10 from inlet ducts 12 He, $SF_6$, and $Cl_2$ gases. When gases are fed through ducts 12, the outer surface of the preform is exposed to an atmosphere containing He, $SF_6$, $Cl_2$ gases, which diffuse through the soot from the outer surface.

At the end of the dehydration and F-doping process, a (dried) soot core preform doped with fluorine in an outermost region of the near-clad region is produced.

In an embodiment, during dehydration and F-doping, the soot preform remains stationary with respect to the vertical direction of the furnace body, in correspondence to the drying hot zone 15, and rotates in order to ensure axial symmetry of the process. In this embodiment, at the end of the dehydration and fluorine-doping phase, the preform 24 is moved down towards a consolidation hot zone 16 positioned below the drying hot zone 15 (always indicated with a dotted line in FIG. 1). The consolidation hot zone 16 extends along the furnace longitudinal direction for a second longitudinal section of the furnace body 10 and it is set at a consolidation temperature, Tc, of from 1500° C. to 1650° C.

In an embodiment (not shown), the furnace has a single hot zone and the soot preform remains stationary both during dehydration and F-doping phase and the consolidation phase. In this case, at the end of the dehydration and F-doping phase, temperature of the hot zone is raised to the consolidation temperature.

In the apparatus shown in FIG. 1, the drying hot zone and the consolidation hot zone are separated one from another by a transition zone 14. In some embodiments, the simultaneous dehydration and F-doping step comprises a first stage in which the soot preform remains stationary with respect to the vertical direction of the furnace body and in correspondence to the drying hot zone 15 set at a temperature Td, and a second stage, subsequent to the first stage, in which the soot preform is moved down, preferably at constant speed, towards the consolidation hot zone 16.

In some embodiments, the second stage of dehydration and fluorine doping, when the preform 24 is moved down towards the consolidation hot zone 16, comprises:

moving down the preform for a first processing time at a first descent rate, preferably constant, toward the consolidation hot zone 16 set at an intermediate temperature Ti higher than the temperature Td, while exposing the outer surface of the soot preform to an atmosphere including a chlorine-containing gas and a fluorine-containing gas, and setting the consolidation hot zone 16 at a temperature Tc higher than Ti, and moving down the preform for a second processing time at a second descent rate, preferably constant, while exposing the outer surface of the soot preform to an atmosphere including a chlorine-containing gas and a fluorine-containing gas, as long as the temperature of the consolidation zone increases from Ti to Tc.

Preferably, flow of an inert gas, preferably helium, continues during the whole descent of the preform and the subsequent consolidation phase.

In some embodiments, when the temperature of the consolidation hot zone reaches Tc, the process comprises turning off the chlorine-containing gas and the fluorine-containing gas while keeping moving down the soot preform at the second descent rate until it enters the consolidation hot zone 16.

Preferably, the difference between the intermediate temperature Ti and the consolidation temperature, (Tc−Ti), is of from 40° C. to 80° C. In some embodiments, Ti is of from 1450° C. to 1550° C.

When entering the consolidation hot zone, the central longitudinal hole 17 is connected to the vacuum pump 22 through vacuum duct 21 to create a vacuum of less than 100 mbar, while the core preform 24 undergoes to a sintering or consolidation process. In the consolidation process, the preform is gradually lowered through the consolidation hot zone maintained at a temperature Tc higher than that of the drying hot zone. Preferably, the temperature Tc of the consolidation hot zone during consolidation is of from 1500° C. to 1650° C. The preform is down driven through the consolidation hot zone at a given rate in order to fully consolidate the preform from the bottom to the top. By passing through the consolidation hot zone 16, the porous preform shrinks radially (and axially) with simultaneous collapse of the central hole and it is vitrified so as to obtain a glass core preform.

Simultaneous consolidation of the soot core preform and closure of the preform's central longitudinal hole is carried out by exposing the soot core preform to an atmosphere substantially devoid of fluorine and substantially devoid of chlorine. With reference to "substantially devoid of chlorine" it is meant an atmosphere having no intentionally added chlorine.

The solid glass core preform obtained by the method consistent with the present disclosure has a refractive index profile comprising a core region and a near-clad region, wherein the near-clad region comprises a fluorine-doped region having a negative relative difference of refractive index. The refractive index relative difference is defined as $\Delta_i=(n_i-n_0)$, which can be positive or negative, where $n_i$ is the largest refractive index (maximum or minimum) in the i-region of the refractive index profile and $n_0$ is the refractive index of the outer cladding, typically made of undoped silica. With undoped silica it is meant silica glass non-intentionally doped, which will be referred also to as pure silica. The refractive index difference is said to be negative if $n_i$ is less than the reference refractive index, $n_0$. A region with negative refractive index difference is referred to as a depressed-index region or trench. The value of a region with positive or negative relative difference refractive index is taken to be the maximum or the minimum value within the region, respectively.

Figure 2:
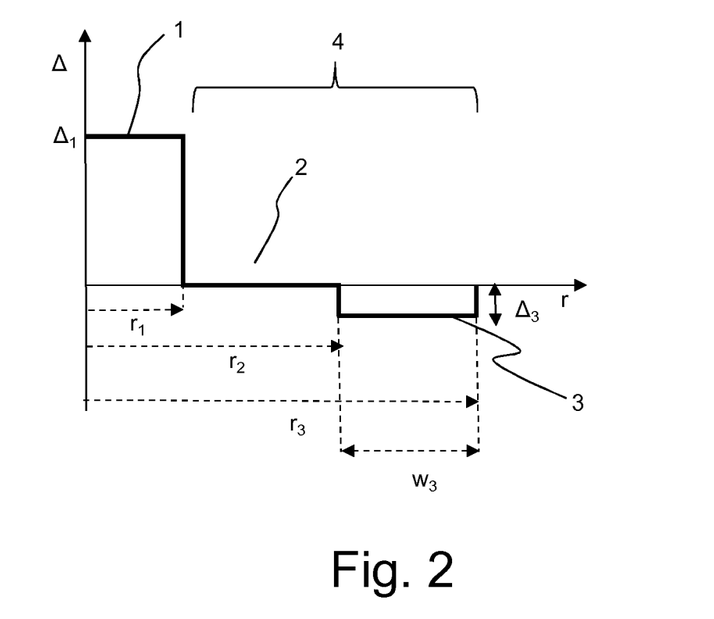
FIG. 2 is a diagram schematically illustrating the designed relative refractive index profile of an optical fibre according to some embodiments of the present disclosure.

FIG. 2 is a diagram schematically illustrating the relative refractive index profile of a glass core preform according to some embodiments of the invention, showing the different regions of the profile as a function of the radial distance r from the centre of the fibre, i.e. the vertical axis represents the centreline of the optical fibre (r=0). The optical fibre comprises a core region 1 surrounded by a near-clad region 4. Preferably, the near-clad region is in contact with the core region.

The near-clad region 4 comprises an inner annular region 2, extending radially outwardly the core region 1 and in contact with the core region, and an outer annular region 3 extending radially outwardly the inner annular region 2. Preferably, the outer annular region 3 is in contact with the inner annular region 2. In many embodiments, such as that shown in FIG. 2, the outer annular region 3 is the outermost radial region of the core preform.

Preferably, the near-clad region 4 is formed by the inner annular region and the outer annular region.

As the overcladding of single-mode optical fibres used for transmission, which surrounds the core rod, is generally made of pure silica, the relative index profile takes as a reference ($\Delta_0=0$) the refractive index of the overcladding layer. The presence of fluorine doping decrease the refractive index resulting in an average relative negative refractive index difference, of value $\Delta_3$, whose magnitude in general depends on the fluorine content. The outer annular region 3 is thus a depressed-index region.

The core region 1 has a positive relative index percent $\Delta_1$ and is a central region extending from the fibre centreline to a core radius, $r_1$. The fibre core region 1 is preferably made of silica doped with a doping element that increases the refractive index, such as germanium, so as to form a step-index profile with positive relative refractive index $\Delta_1$.

In FIG. 2, the inner cladding region 2 extends from the core region 1 to a radius $r_2$, whereas the outer cladding region 3 extends from the inner cladding region to a radius $r_3$. The inner cladding region 2 is preferably made of non intentionally doped silica.

Preferably, $r_3$ is of from 13 μm to 25 μm, more preferably of from 15 to 20 μm.

A width $w_3$ of the outer annular region (i.e. trench) 3 can be defined as $(r_3-r_2)$. Since the outer annular region 3 is preferably the outermost radial region of the glass core preform, the width $w_3$ substantially corresponds to the penetration depth of the fluorine from the outer surface of the core preform. In some embodiments, the ratio $w_3/r_3$ is of 0.20 to 0.40, preferably of from 0.25 to 0.35. In an embodiment, the penetration depth is $0.25 \times r_3$.

A parameter that is often used as indicative of the cost and performance of the produced optical fibre is the core-to-clad ratio of a glass core rod, a/b, where a is the radius of the core region of the core rod and b is the external radius of the near clad region surrounding the core region. The larger the value of a/b, the higher can be the yield of the manufacturing process since more core rods can be obtained from a single soot preform. In general, the core-to-clad ratio of the preform is preserved in the drawn optical fibre. With reference to FIG. 2, a/b corresponds to the ratio $r_1/r_3$.

The glass core preform has a core-to-clad ratio, a/b, of from 0.20 to 0.40. Preferably, the glass core preform has a core-to-clad ratio, a/b, larger than 0.20, more preferably larger than 0.25. In some embodiments, the core-to-clad ratio a/b is of from 0.20 to 0.35. In a preferred embodiment, a/b is larger than 0.25 and smaller than 0.35.

Subsequently to the consolidation of the core preform and closure of the central hole, the glass core preform is extracted from the furnace body and it is subjected to a stretching process to reduce its outer diameter and enhance straightness of the cylindrical rod. Stretching process can be carried out by means of a conventional stretching apparatus. The stretched core preform is severed in a plurality of core rods, each of the core rods constituting a central region of a final optical fibre preform.

Each core rod is used as substrate for an overcladding process, per se known. Preferably, a soot overclad layer is formed by depositing soot material on the outer circumference of the core rod by a flame hydrolysis process. Preferably, the overcladding region is formed by an OVD process, in which the core rod is placed on a horizontal lathe and deposition of silica soot takes place outside the rotating preform until the desired amount of material, which is related to the desired thickness of overclad region, is grown around the core rod. Once the desired thickness of the soot overclad layer is achieved on the core rod, soot deposition for the formation of the soot overclad layer is terminated. Preferably, the overclad region is made of pure silica.

The resulting partially porous preform is dried and sintered in a furnace, which can be a dehydration-consolidation furnace of the type described with reference to FIG. 1, in which gases are fed only from the bottom side of the furnace body. Consolidation produces a glass preform for an optical fibre.

Following the formation of a glass optical fibre preform, the glass optical fibre preform is lowered at a relatively low speed into a drawing tower including a furnace having a hot zone where it is heated at a melting temperature (typically, at a temperature of from 1900° C. to 2100° C.) in the neck-down region, where glass softens and it is submitted to reduction in cross-sectional area to the desired cross-sectional area of the fibre. From the lower tip of the neck-down region, the optical fibre emerges where it is gripped by a mechanical device and wound in one or more reels. Typical diameter of the single-mode fibre is of about 125 μm.

It is noted that the profile of the glass core preform is preserved in the core rod (obtained from stretching the core preform) and in the final optical fibre (upon drawing a final glass preform, having an overcladding layer surrounding the core rod, into an optical fibre).

EXAMPLES

Example 1 (Comparative)

A cylindrical alumina mandrel of about 1.4 m length and 12 mm of diameter was secured to a hollow tubular handle at one of its ends. The hollow tubular handle and the opposite end of the mandrel were mounted on a lathe for the formation of a $GeO_2$-doped silica porous soot preform by outside vapor deposition (OVD). Flow-rates of reactants $GeCl_4$ and $SiCl_4$ were varied during deposition, in a way per se known, to obtain a predetermined refractive index profile in the soot preform. The resulting core soot preform had a step-index profile with a germanium-doped core region and an undoped silica near-clad region surrounding and in contact with the core region for obtaining a core-to-clad ratio, a/b, of 0.30.

The mandrel was then extracted from the core soot preform, leaving a central hole therein, extending longitudinally across the core soot preform. The porous soot core preform was inserted in a consolidation furnace of the type shown in FIG. 1.

The soot core preform was maintained in a drying hot zone of the consolidating furnace at Td=1100° C., for 60 minutes in a 80 l/min He+1.5 l/min $Cl_2$ flow, while rotating with rotational speed of 1 turn/min in order to assure axial symmetry. Then, the soot preform was down-driven at 5.2 mm/min toward the consolidation hot zone set at Ti=1540° C. of the consolidating furnace, in the same atmosphere, for about 120 min.

The preform continued to be down-driven at the same rate for an additional about 40 min, while the temperature of the consolidation hot zone was raised to about Tc=1600° C. At the end of the additional time for descent of the preform, the bottom part of the preform was very close (i.e. about to enter) the consolidation hot zone.

At that point, the $Cl_2$ flow was stopped and the He flow was lowered to 20 l/min. The descent rate of the preform was reduced to 4 mm/min, and the central longitudinal hole of the preform was connected to a vacuum pump creating a pressure lower than 100 mbar. The bottom part entered the consolidation hot zone and started to collapse and consolidate. These conditions were maintained for about 160 min, resulting in the consolidation of the full preform and simultaneous closure of the central hole.

The consolidated glass core preform was subjected to a stretching process in a furnace at about 1800° C. to reduce its outer diameter and enhance straightness of the cylindrical rod. The stretched core preform was severed in a plurality of cylindrical elongated core rods of about 16 mm diameter and about 1.35 m length.

A core rod was used as a substrate for a further process of chemical deposition by OVD to form a silica soot layer for the overclad region. Nearly 15000 grams of silica soot was deposited by using a $SiCl_4$ reactant.

The partially porous preform was inserted in a consolidation furnace of the type shown in FIG. 1. The partially porous preform was maintained in the drying hot zone at about 1100° C. of the consolidating furnace, for 30 minutes in a 15 l/min He+0.9 l/min Cl2 flow, while uniformly rotating with a rotational speed of 3 turn/min in order to assure axial symmetry. Then, the soot preform was sintered by down driving it through the consolidation hot zone at 1500° C. of the consolidating furnace, at a descent rate of 7 mm/min in the same He and $Cl_2$ atmosphere used during dehydration. A consolidated optical fibre preform was obtained.

The glass optical fibre preform was then placed for 12 h in a holding oven at 1000° C.

A plurality of glass optical fibre preforms were produced with the above method from the plurality of core rods. The optical fibre preforms were drawn on a drawing tower, wherein the preform was supplied, along a vertical direction, to a graphite furnace at about 2000° C. in helium flow, to obtain optical fibres of average diameter of 125 μm.

Optical properties of several optical fibre length sections, which were wound up in respective bobbins were measured. Average values of optical properties measured on several bobbins for the Examples are reported in Table I and Table II.

In all examples herein described, the mode field diameter (MFD) of an optical fibre was measured according to the IEC 60793-1-45 (2001-07) standard, at a wavelength of 1310 nm. The cable cut-off wavelength, $(\lambda_{cc})_f$, of optical fibres was measured according to the cut-off test Method A described in the IEC-60793-1-44 (2001-07) standard.

The MAC number is defined as the ratio between mode field diameter (MFD) measured at 1310 nm in accordance with the above standard, in microns, and the cable cut-off wavelength, in microns.

Macrobending loss (in dB) was determined as the attenuation increase at a given wavelength (1625 nm or 1550 nm) measured at room temperature in a fibre wound for ten turns around a mandrel having a radius of 15 mm or in a fibre wound for one turn around a mandrel of 10 mm-radius as it is specified in the Tables.

ITU-T G.657.A1 (10/2012) recommendations indicate maximum values for macrobending loss of 0.25 dB/10 turn at 1550 nm and of 1.0 dB/10 turn at 1625 nm in a 15 mm-radius mandrel, and of 0.75 dB/turn at 1550 nm and 1.5 dB/turn at 1625 nm in 10-mm mandrel. The average values of the fibres were within the ITU-T specification but some samples exceeded such limits.

The optical attenuation of fibres produced according to this Example were below 0.33 dB/km at 1310 nm, below 0.30 dB/km at 1383 nm, and below 0.19 dB/km at 1550 nm.

TABLE I

| Example | $(\lambda_{cc})_f$ (nm) | MFD (μm) | MAC |
|---|---|---|---|
| 1 | 1160 | 9.1 | 7.8 |
| 3 | 1198 | 9.3 | 7.8 |
| 4 | 1173 | 9.2 | 7.9 |

TABLE II

| Example | Bending loss @1550 nm 15 mm-radius (dB/10 turns) | Bending loss @1625 nm 15 mm-radius (dB/10 turns) | Bending loss @1550 nm 10 mm-radius (dB/turn) | Bending loss @1625 nm 10 mm-radius (dB/turn) |
|---|---|---|---|---|
| 1 | 0.14 | 0.63 | 0.48 | 1.25 |
| 3 | 0.09 | 0.25 | 0.19 | 0.72 |
| 4 | 0.09 | 0.32 | 0.27 | 0.73 |

Example 2

Germanium doped silica soot and pure silica soot were deposited via OVD using $SiCl_4$ and $GeCl_4$ reactant onto an alumina target rod of about 1 meter length and about 10 mm diameter for obtaining a step index profile with core-to-clad ratio of a/b=0.3.

At the end of the deposition process, the alumina rod was removed from the soot core preform, which was then inserted in a consolidation furnace of the same type of that of Example 1.

The soot core preform was maintained in a drying hot zone of the consolidating furnace at Td=1100° C., for 60 minutes in an 80 l/min He+1.5 l/min $Cl_2$ flow, while rotating with rotational speed of 1 turn/min in order to assure axial symmetry. Then, for a processing time of about 120 min, a fluorinated gas compound was added in the atmosphere which the soot preform was exposed to and concurrently the soot preform was down-driven at 5.2 mm/min toward the consolidation hot zone of the furnace set at Ti=1540° C. During this phase of dehydration and doping with fluorine, the soot core preform was exposed to a flow of 80 l/min He+1.5 l/min $Cl_2$+0.08 l/min $SF_6$.

Then the flow of $SF_6$ was turned off, the temperature of the consolidation hot zone was raised to Tc=1600° C. and the preform continued to be down-driven at the same descent rate of 5.2 mm/min for an additional time of about 40 min.

At the end of the additional time for descent of the preform, the bottom part of the preform was very close to the consolidation hot zone. At that point, the flow of $Cl_2$ was turned off, the flow rate of He lowered to 20 l/min and the descent rate of the preform was reduced to 4 mm/min, while the central longitudinal hole of the preform was connected to a vacuum pump creating a pressure lower than 100 mbar.

The bottom part entered the consolidation hot zone and started to consolidate into a solid glass preform. These conditions were maintained for about 160 min resulting in the contemporary closure of the central channel and the consolidation of the full core preform.

The consolidated glass core preform was subjected to a stretching process in a furnace at about 1800° C. to obtain a plurality of core rods of about 16 mm diameter and about 1.35 m length.

The core-rods were characterised with a commercial York P106 preform-analyser to check for the occurrence of a down-doped trench region in the refractive index profile.

Measurements revealed an external depressed-index annular region, extending from the outer surface of the core rod to about 17% of the radius, with a relative refractive index $\Delta_3$ of about −0.0015 with respect to that of pure silica.

Figure 3:
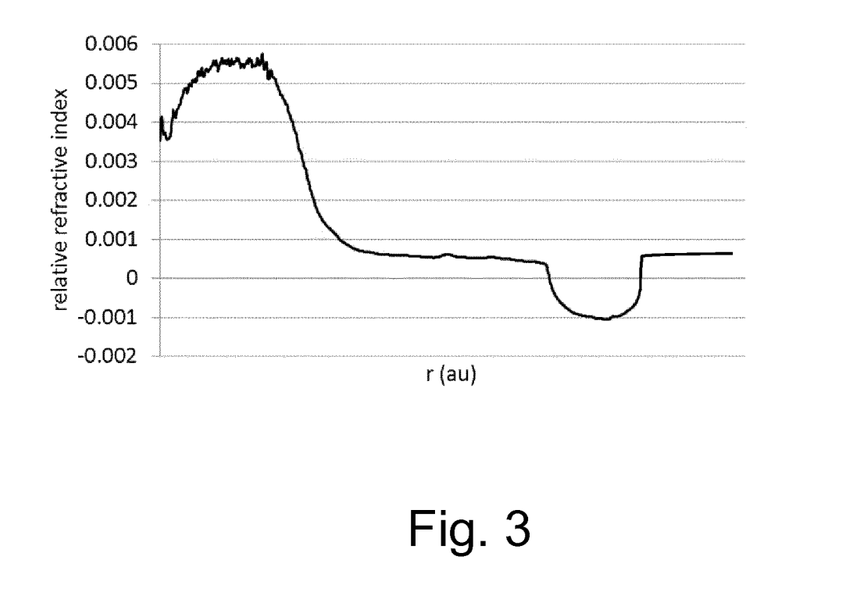
FIG. 3 shows a measured relative refractive index profile of a core rod produced according to an example described in the present application.

FIG. 3 shows a measured refractive index profile of a core rod produced according to this Example.

The core rod was not further processed into an optical fibre.

Example 3

Germanium doped silica soot and pure silica soot were deposited via OVD using $SiCl_4$ and $GeCl_4$ reactant onto an alumina target rod of about 1 meter length and about 10 mm diameter to obtain a step index profile with core-to-clad ration of a/b=0.3.

At the end of the deposition process, the alumina rod was removed from the soot core preform, which was then inserted in a dehydration and consolidation furnace of the same type of that of Example 1.

The preform was maintained in the drying hot zone at Td=1100° C. of the consolidating furnace, for 60 minutes in a flow of 80 l/min He+1.5 l/min $Cl_2$+0.08 l/min $SF_6$, with a rotational speed of 1 turn/min. While the preform was in the dehydration hot zone, the consolidation hot zone was set at Ti=1540° C.

Then, the soot preform was down driven at a rate of 5.2 mm/min toward the consolidation hot zone of the furnace set at Ti=1540° C., in the same atmosphere, for about 120 min. Uniform rotation of the preform was carried out also during descent of the preform toward the consolidation hot zone and through the consolidation hot zone.

Next, the temperature of the consolidation hot zone was raised to Tc=1600° C., while the preform continued to be down-driven at the same descent rate for an additional time of about 40 min, in the same atmosphere.

At the end of this additional time, the bottom part of the preform was very close to the consolidation hot zone. At that point, the flows of $Cl_2$ and $SF_6$ were turned off, the flow rate of He lowered to 20 l/min and the descent rate of the preform was reduced to 4 mm/min, while the central channel of the preform was connected to a vacuum pump creating a pressure lower than 100 mbar.

It is noted that in this Example dehydration and fluorine-doping was carried out by exposing the soot core preform to an atmosphere containing a chlorine-containing gas and a fluorine-containing gas throughout the process until the preform reached the consolidation hot zone and consolidation process started.

The preform bottom part entered the consolidation hot zone and started to consolidate into a solid glass preform. These conditions of He flow of 20 l/min, Tc=1600° C. and descent rate of 4 mm/min were maintained for about 160 min together with the application of a vacuum, resulting in the contemporary closure of the central channel and the consolidation of the full core preform.

The consolidated glass core preform was subjected to a stretching process in a furnace at about 1800° C. to obtain a plurality of core rods of about 16 mm diameter and about 1.35 m length.

Figure 4:
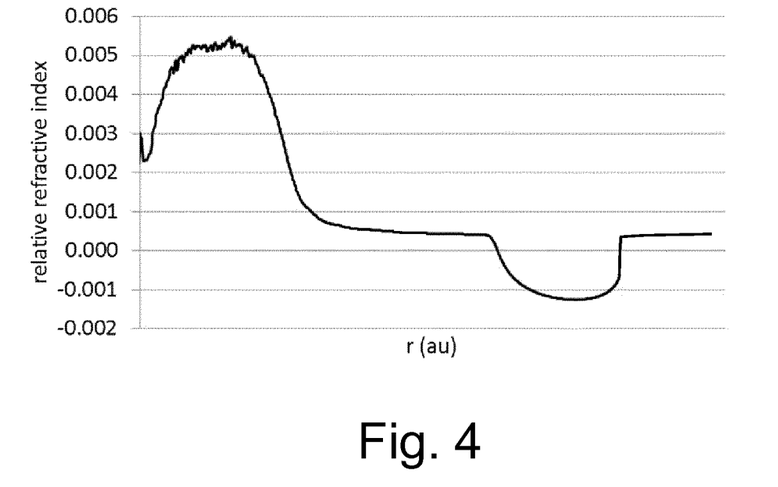
FIG. 4 shows a measured relative refractive index profile of a core rod produced according to a further example described in the present application.

The core-rods were characterised with the York P106 preform-analyser and exhibited an external depressed-index annular region, extending from the outer surface of the core rod to about ¼ of the core rod radius, with a relative refractive index, $\Delta_3$, of about −0.002 with respect to that of pure silica (in the figure at about 0.0005).

An exemplary refractive index profile of core rods obtained according to this Example is reported in FIG. 4.

Core rods were used as a substrate for a further process of chemical deposition by OVD to form a silica soot layer for the overclad region. Nearly 15000 grams of silica soot was deposited by using a $SiCl_4$ reactant on each core preform.

The partially porous preforms were then processed in the same way as in Example 1 to obtain optical fibres.

Optical properties of several optical fibre length sections, which were wound up in respective bobbins were measured. Average values of optical properties measured on several bobbins for this Example are reported in Table I and Table II (Example 3). Each value of macrobending loss is compliant with the ITUT G.657.A1 (10/2012) recommendations and significantly reduced with respect to the respective values of Example 1.

Example 4

Germanium doped silica soot and pure silica soot were deposited via OVD using $SiCl_4$ and $GeCl_4$ reactants onto an alumina target rod of about 1 meter length and 10 mm diameter to obtain a step index profile with core-to-clad ration of a/b=0.3.

At the end of the deposition process, the alumina rod was removed from the soot core preform, which was then inserted in a dehydration and consolidation furnace of the same type of that of Example 1.

The preform was maintained in the drying hot zone at about 1100° C. of the consolidating furnace, for 60 minutes in a flow of 80 l/min He+1.5 l/min $Cl_2$+0.05 l/min $SF_6$, while rotating the preform with a rotational speed of 1 turn/min.

Then, the soot preform was down driven at a rate of 2.6 mm/min toward the consolidation hot zone of the furnace set at Ti=1540° C., in the same atmosphere, for about 240 min.

Next, the temperature of the consolidation hot zone was raised to Tc=1600° C., while the preform continued to be down-driven at the same descent rate (2.6 mm/min) for an additional time of about 70 min, in the same atmosphere.

It is noted that, with respect to the drying and fluorine-doping phase of Example 3, the flow rate of $SF_6$ was smaller, whereas flow rates of helium and $Cl_2$ were the same. It is also noted that values of descent rate and, consequently, descent time were different from those Example 3.

At the end of this additional time, the bottom part of the preform was very close to the consolidation hot zone. At that point, the flows of $Cl_2$ and $SF_6$ were turned off, the flow rate of He lowered to 20 l/min and the descent rate of the preform was raised to 4 mm/min, while the central channel of the preform was connected to a vacuum pump creating a pressure lower than 100 mbar. The preform bottom part entered the consolidation hot zone and started to consolidate into a solid glass preform. These conditions were maintained for about 160 min resulting in the contemporary closure of the central channel and the consolidation of the full core preform.

Uniform rotation of the preform was carried out also during descent of the preform from the drying hot zone toward the consolidation hot zone and through the consolidation hot zone.

The consolidated glass core preform was subjected to a stretching process in a furnace at about 1800° C. to obtain a plurality of core rods of about 16 mm diameter and about 1.35 m length.

The core-rods were characterised with the York P106 preform-analyser and exhibited an external depressed-index annular region, extending from the outer surface of the core rod to about ⅝ of the radius, with a relative refractive index, $\Delta_3$, of about −0.002 with respect to that of pure silica.

Figure 5:
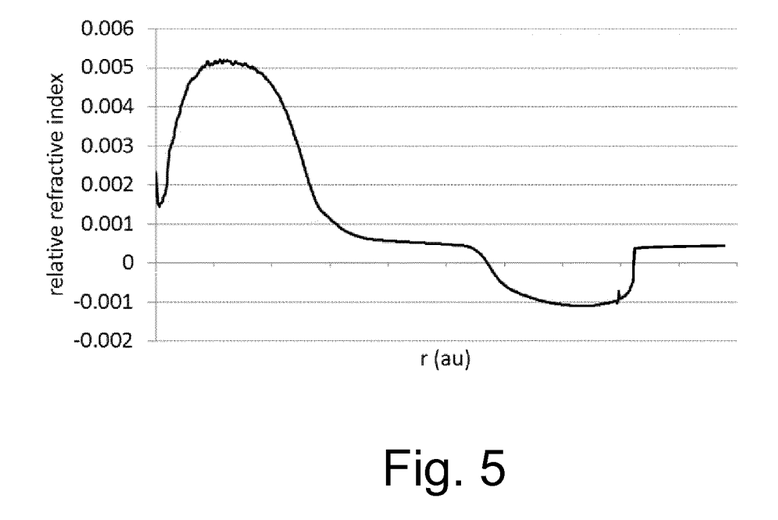
FIG. 5 shows a measured relative refractive index profile of a core rod produced according to a still further example described in the present application.

An exemplary refractive index profile of core rods obtained according to this Example is reported in FIG. 5.

Core rods were used as a substrate for a further process of chemical deposition by OVD to form a silica soot layer for the overclad region. Nearly 15000 grams of silica soot was deposited by using a $SiCl_4$ reactant on each core preform.

The partially porous preforms were then processed in the same way as in Example 1 to obtain optical fibres.

Optical properties of several optical fibre length sections, which were wound up in respective bobbins were measured. Average values of optical properties measured on several bobbins for this Example are reported in Table I and Table II (Example 4). Each value of macrobending loss is compliant with the ITUT G.657.A1 (10/2012) recommendations and significantly reduced with respect to the respective values of Example 1.

Figure 6:
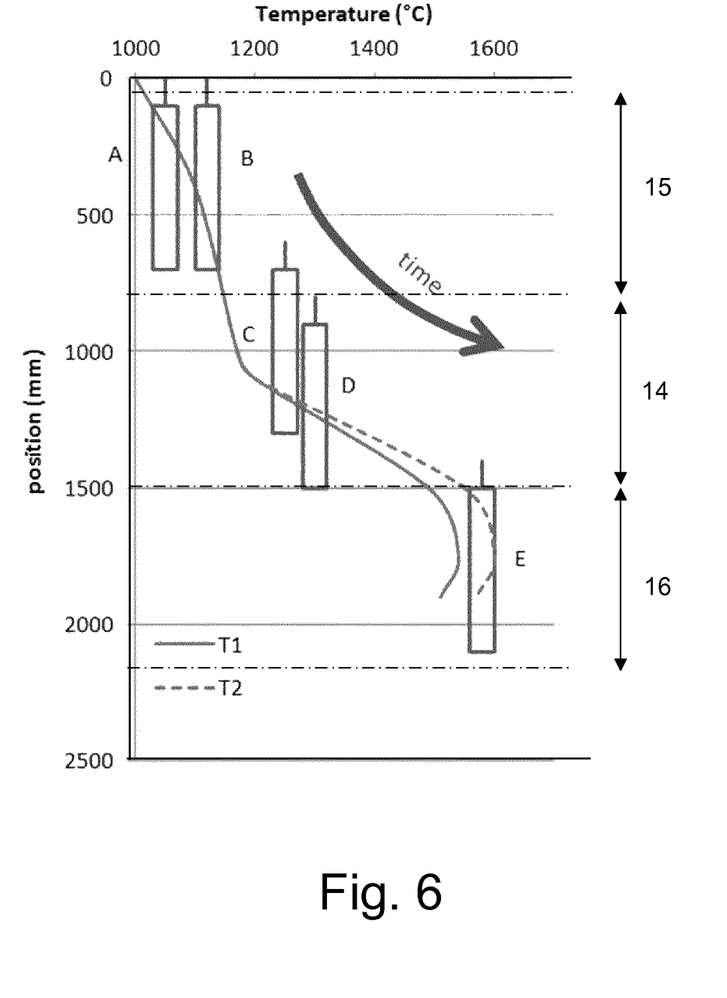
FIG. 6 is a plot model representing schematically the temperature gradient and the longitudinal position of the preform in a furnace during a process of combined dehydration and fluorine-doping and of consolidation of a core soot preform, in accordance with some embodiments.

FIG. 6 is a plot model schematically representing the temperature gradient and the longitudinal position of the preform in a furnace body during the process of dehydration and consolidation of a core soot preform, consistent with Examples 2 to 4 of the present disclosure. In the y-axis of the plot, the longitudinal position along the furnace body, where the value 0 represents the top of the furnace. Drying hot zone 15, transition zone 14 and consolidation hot zone 16 are indicated in the figure by horizontal dot-dash lines. Letters "A" to "E" indicate the temporal evolution of the dehydration and consolidation process. The position of the preform along the x-axis give an estimation of the average temperature of the preform at the corresponding time. Length of the furnace muffle is of 2.5 m.

The soot core preform is inserted at time A in the drying hot zone 15 for thermal stabilisation and dehydration until time B. The temperature of the drying hot zone is set at 1100° C. At times between A and B, the estimated temperature of the preform ranges approximately from 1000° C. and 1100° C.

Starting at time A, simultaneous dehydration and F-doping takes place in an atmosphere containing helium, chlorine and a fluorine-containing gas.

A first stage of dehydration and F-doping is under nearly isothermal conditions and the preform rotates while being stationary in the drying hot zone 15. While dehydration and F-doping takes place, the consolidation hot zone is set at a temperature Ti larger than the dehydration temperature, but lower than the consolidation temperature Tc.

In another embodiment, fluorine-containing gas is turned on at time B.

In a second stage of dehydration and F-doping, following the first stage, the soot preform is gradually lowered at a constant rate towards consolidation hot zone 16. During the descent, the preform is in the transition zone 14 of the furnace body. For Ti=1540° C. and times between B and C, the estimated temperature of the preform ranges approximately from 1100° C. to 1250° C. At time C, fluorine-containing gas is turned off and the temperature of the consolidation hot zone is raised to a value Tc that will be used during consolidation as the preform continues its descent at the same rate. In the example, temperature is raised to Tc=1600° C. At times between C and D, the estimated temperature of the descending preform ranges approximately from 1100° C. and 1350° C. At time D, the bottom of the preform enters the consolidation hot zone at 1600° C., chlorine-containing gas is turned off, and consolidation starts from the bottom to the top of the preform. Consolidation, simultaneously to the collapse of the preform central hole, is carried out until time E at which the whole preform has crossed the consolidation hot zone 16 and a core preform of solid glass is obtained.

In another embodiment, both fluorine-containing gas and chlorine-containing gas are turned off at time D.

Curves in the graph of FIG. 6, indicated with T1 (solid line) and T2 (dashed line), represent the thermal profiles in the furnace, namely the local temperature at each longitudinal position of the furnace, independently from the presence of the preform in that position. Temperature profiles were obtained by measuring the temperature at different heights in the muffle. Ti is the thermal profile when the consolidation hot zone is maintained at the intermediate temperature of 1540° C., while T2 is the thermal profile when the temperature of the consolidation hot zone temperature is raised to 1600° C. at time C.

The invention claimed is:

1. A method for manufacturing a core preform for optical fibres, the method comprising:
   providing a porous soot core preform comprising a central longitudinal hole extending axially therethrough and a core-to-clad ratio ranging from 0.20 to 0.40;
   simultaneously dehydrating and doping with fluorine, in which doping with fluorine occurs in a single step, the soot core preform at a temperature ranging from 1000° C. to 1350° C. by exposing the soot core preform to an atmosphere containing a chlorine-containing gas and a fluorine-containing gas, the content of the fluorine-containing gas in the atmosphere ranging from 0.01% to 0.50% by volume, and
   simultaneously consolidating the soot core preform and collapsing the central longitudinal hole by exposing the soot core preform to an atmosphere substantially devoid of fluorine and of chlorine at a consolidation temperature ranging from 1500° C. to 1650° C. while reducing the pressure down the central longitudinal hole, thereby forming a glass core preform having a substantially uniformly fluorine doped region along its length and a shallow trench obtained by fluorine doping having (i) a relative refractive index ranging from −0.0015 to −0.0035 (ii) at a distance away from a core region to avoid structural defects that increase hydrogen sensitivity of the glass core preform.

2. The method of claim 1, wherein the content of the fluorine-containing gas in the atmosphere ranges from 0.05% to 0.20% by volume.

3. The method of claim 1, wherein the concentration of the chlorine-containing gas in the atmosphere during simultaneous dehydration and doping with fluorine the soot core preform ranges from 0.5% to 3.0% by volume.

4. The method of claim 1, wherein reducing the pressure down into the central hole is to a pressure of less than 100 mbar.

5. The method of claim 1, further comprising, before simultaneously dehydrating and doping with fluorine the soot preform, exposing the soot core preform to an atmosphere containing a chlorine-containing gas and substantially devoid of fluorine.

6. The method of claim 5, wherein exposing the soot core preform to an atmosphere including a chlorine-containing gas and substantially devoid of fluorine is performed at a temperature ranging from 1000° C. to 1350° C.

7. The method of claim 1, wherein the gaseous atmosphere during simultaneous dehydration and doping with fluorine the soot core preform is an atmosphere containing an inert gas.

8. The method of claim 1, wherein the atmosphere during consolidation contains an inert gas.

9. The method of claim 1, wherein the chlorine-containing gas is $Cl_2$ gas.

10. The method of claim 1, wherein the fluorine-containing gas is a gaseous compound selected from the group consisting of $SiF_4$, $SF_6$, $CF_4$, and $C_2F_6$.

11. A method for manufacturing an optical fibre comprising:
    manufacturing a glass core preform according to claim 1;
    stretching the glass core preform to reduce its outer diameter thereby forming at least one glass core rod;
    overcladding the glass core rod to form an optical fibre preform formed by the glass core rod surrounded by a glass overclad layer, and
    drawing the optical fibre preform to produce an optical fibre.

* * * * *